United States Patent [19]

Willis

[11] Patent Number: 4,851,474
[45] Date of Patent: Jul. 25, 1989

[54] BLOCK COPOLYMER AND METHOD OF PREPARING SAME

[75] Inventor: Carl L. Willis, Houston, Tex.

[73] Assignee: Shell Oil Company, Houston, Tex.

[21] Appl. No.: 102,465

[22] Filed: Sep. 29, 1987

[51] Int. Cl.$^4$ .................. C08G 81/02; C08L 53/02
[52] U.S. Cl. ................................. 525/92; 525/171
[58] Field of Search ............................ 525/92, 171

[56] References Cited

U.S. PATENT DOCUMENTS

| | | | |
|---|---|---|---|
| 3,135,716 | 6/1964 | Uraneck et al. | 260/45.5 |
| 3,150,209 | 9/1964 | Short et al. | 260/894 |
| 3,231,635 | 1/1966 | Holden et al. | 260/880 |
| 3,265,765 | 12/1941 | Schultz et al. | 200/126 |
| 3,322,856 | 5/1967 | Holden et al. | 260/876 |
| 3,489,707 | 1/1970 | Fry | 260/31.6 |
| 3,496,154 | 2/1970 | Wofford | 260/84.7 |
| 3,498,960 | 3/1970 | Wofford | 260/84.7 |
| 3,598,882 | 8/1971 | Brinkmann | 525/177 |
| 3,700,633 | 10/1972 | Wald et al. | 260/880 B |
| 3,705,208 | 12/1972 | Nakamuta | 525/171 |
| 3,925,299 | 12/1975 | Phillips | 260/40 R |
| 3,925,300 | 12/1975 | Roberts et al. | 260/40 R |
| 4,020,036 | 4/1977 | South, Jr. | 260/40 R |
| 4,145,298 | 3/1979 | Trepka | 252/51.5 |
| 4,238,202 | 12/1980 | Trenka et al. | 44/62 |
| 4,287,313 | 9/1981 | Uber | 525/91 |
| 4,329,438 | 5/1982 | Yamori et al. | 525/64 |
| 4,400,478 | 8/1983 | Gergen et al. | 523/514 |
| 4,657,970 | 4/1987 | Shiraki et al. | 525/57 |

FOREIGN PATENT DOCUMENTS 1030306 8/1965 United Kingdom .

Primary Examiner—Patricia Short

[57] ABSTRACT

A modified unsaturated polyester useful in preparing molded products having improved impact resistance and surface characteristics is prepared as a block copolymer comprising at least one polyester block and an elastomeric block. The modified unsaturated polyester is prepared by reacting an elastomeric polymer having at least one terminal functional group selected from the group consisting of carboxyl groups, hydroxyl groups and mixtures thereof with either a preformed unsaturated polyester, thereby producing the modified unsaturated polyester directly or with monomer useful in preparing an unsaturated polyester and thereafter growing the unsaturated polyester via condensation of additional monomer. The elastomer is, preferably, a block copolymer comprising at least one polymer block containing predominantly monoalkenyl aromatic hydrocarbon monomer and at least one polymer block containing predominantly conjugated diolefin monomer units. The modified unsaturated polyester is useful in thermosetting resin compositions.

12 Claims, No Drawings

BLOCK COPOLYMER AND METHOD OF PREPARING SAME

BACKGROUND OF THE INVENTION

1. Field of the Invention

This invention relates to a thermoplastic block copolymer, to a method for preparing said block copolymer and to compositions comprising said block copolymer. More particularly, this invention relates to a thermoplastic block copolymer comprising a polyester block, to a method for preparing said thermoplastic block copolymer and to thermosetting compositions comprising said block copolymer.

2. Prior Art

The use of unsaturated polyesters in thermosetting resin compostions, is, of course, well known in the prior art. Generally, these compositions comprise an unsaturated polyester, a vinyl monomer and a curing agent. The thermosetting resin compositions may also comprise other additives such as fillers, reinforcing agents, antishrinking agents, thickeners and the like.

As is also well known in the prior art, the unsaturated polyester resin compositions, generally, exhibit excellent rigidity, heat resistance and electrical characteristics when used in thermosetting applications. Products, particularly molded products, prepared with unsaturated polyester resin compositions do not, however, generally exhibit good impact resistance or good surface characteristics. The poor surface characteristics are, generally, attributed to shrinkage during curing of the composition. As a result, use of the unsaturated polyester resin compositions in certain applications such as bulk molding and sheet molding applications has been restricted.

In recent years, considerable effort has been made to improve both the impact resistance and surface characteristics of the unsaturated polyester resin composition products so as to expand the areas in which unsaturated polyester resin compositions may be used. Particular emphasis has been placed on using these compositions in bulk molding and sheet molding applications. For example, and as indicated in the background section of U.S. Pat. No. 4,329,438 several methods have, heretofore, been proposed for improving the impact resistance and the surface characteristics of such unsaturated polyester resin compositions. These methods include the addition of either a diolefin rubber or a styrene-diolefin block copolymer to the resin compositions. Further, the use of carboxylated derivatives of styrene-butadiene block copolymers in polyester resin compositions has been tried. As indicated in the background section of said U.S. Pat. No. 4,329,438, however, these methods have not been completely successful due, primarily, to the incompatability of the rubber polymer in the composition and the resulting destructive phase separation which leads to bleeding of the rubber to the surface during aging of the molding paste. Another difficulty with the proposed prior art solutions to the problems, particularly in those cases where a block copolymer is used, is solubility of the polymer in the vinyl monomer which functions both as a crosslinking agent and as a solvent in the composition.

U.S. Pat. No. 4,329,438 teaches yet another method for solving the destructive phase separation problem wherein a carboxylated derivative of a styrene-butadiene block copolymer is used. Specifically, the styrene-butadiene block copolymer is modified by grafting an unsaturated dicarboxylic acid and/or an unsaturated dicarboxylic acid derivative to the block copolymer. According to the disclosure, significant improvement is realized but destructive phase separation and the associated rubber bleeding is apparently not completely eliminated since the block copolymer and the unsaturated polyester apparently remain as a physical admixture in the thermosetting resin composition, at least during any storage or aging thereof. Moreover, since unsaturated block copolymers are used, structures fabricated with the thermosetting resin compositions exhibit poor thermal and oxidation stability.

U.S. Pat. No. 4,020,036 teaches a method for improving impact resistance and surface characteristics similar to that taught in U.S. Pat. No. 4,329,438. It is, however, within the scope of the teaching of U.S. Pat. No. 4,020,036 to prepare and use a carboxyl terminated conjugated diene polymer. The use of a conjugated diolefin polymer having a terminal carboxyl group in the composition of U.S. Pat. No. 4,020,036 would not, however, result in the production of a thermoplastic block copolymer having a polyester block as is contemplated in the present invention. In fact, the composition taught in U.S. Pat. No. 4,020,036 remains a physical admixture subject to destruction phase separation, at least until the composition is cured. After curing, the composition is "thermoset", not "thermoplastic". Moreover, the conjugated diolefin polymer contemplated for use in the compositions taught in U.S. Pat. No. 4,020,036 are unsaturated. Products prepared therewith, therefore, remain subject to oxidative and thermal degradation.

The use of a hydrogenated conjugated diolefin block to improve weatherability and resistance to thermal deterioration is either taught or at least inherent in the polymer compositions taught in U.S. Pat. Nos. 4,400,478 and 4,657,970. Both of these patents also teach the incorporation of carboxylic acid groups into the polymeric modifier for the purpose of improving impact resistance and surface characteristics. The carboxylic acid groups are, however, incorporated via grafting and, as a result, the number of such acid groups actually incorporated is at best difficult to control. To the extent that these carboxyl groups are, then, reacted with a terminal hydroxyl group contained in the ethylenically unsaturated polyester resin the number of polyester resin segments actually incorporated into the polymer would be difficult to control. Moreover, since the carboxyl groups are, in effect, randomly distributed along the elastomer portion of the polymer, the resulting polymer would not, strictly, be classed as a block copolymer.

In light of the foregoing, it is believed apparent that considerable effort has been expended in the development of an unsaturated polyester resin composition that would be useful in bulk molding and sheet molding applications. As also believed apparent from the foregoing, this effort has not yet produced such a composition exhibiting good improvement in such properties as impact resistance, weatherability and resistance to thermal deteriorioation and at the same time permitted good control over the ratio of unsaturated polyester segments to modifier segments in the thermosetting resin composition. The need, therefore, remains for such an improved unsaturated polyester resin composition.

SUMMARY OF THE INVENTION

It has now been discovered that the foregoing and other disadvantages of the prior art polyester resin compositions can be overcome or at least significantly reduced with the modified polyester and particularly the block copolymer of this invention and an improved thermosetting polyester resin composition produced therewith. It is, therefore, an object of this invention to provide: a modified polyester, which modified polyester is a block copolymer; a method for preparing said modified polyester; and a thermosetting polyester resin composition comprising the modified polyester. It is another object of this invention to provide such a modified polyester which when formulated into a thermosetting polyester resin composition will not be subject to destructive phase separation. It is still another object of this invention to provide such a modified polyester which when formulated into a thermosetting polyester resin composition and cured will yield a molded product having improved impact resistance. It is a still further object of this invention to provide such a modified polyester which, when formulated into a thermosetting polyester resin composition and cured, will yield a molded product exhibiting less shrinkage and hence, better surface characteristics. It is an even further object of this invention to provide such a modified polyester resin composition exhibiting improved weatherability and resistance to thermal deterioration. The foregoing and other objects and advantages will become apparent from the description set forth hereinafter and from the examples incorporated therein.

In accordance with the present invention, the foregoing and other objects and advantages are accomplished by incorporating an unsaturated polyester as a block in a block copolymer comprising at least one polyester block and at least one substantially saturated elastomeric block. The block copolymer may be prepared by reacting a preformed substantially saturated elastomeric polymer having at least one terminal carboxyl or hydroxyl group with a preformed unsaturated polyester or by reacting a preformed carboxyl or hydroxyl terminated elastomeric polymer which is substantially saturated with a suitable polyhydric substituted alcohol or polycarboxylic acid and thereafter forming the unsaturated polyester by condensing a mixture of such polyhydric alcohols and polycarboxylic acids. As used herein, the recitation "substantially saturated" is intended to mean that the elastomeric portion of the block copolymer does not contain a sufficient amount of ethylenic unsaturation to permit a significant amount of oxidative or thermal degradation. To the extent that the elastomeric segment of the block copolymer initially contains ethylenic unsaturation, the block copolymer will, at some point, be hydrogenated, to reduce the amount of ethylenic unsaturation contained therein, as indicated hereinafter.

DETAILED DESCRIPTION OF THE INVENTION

As indicated supra, the present invention relates to a modified unsaturated polyester resin, which modified unsaturated polyester resin is a block copolymer, comprising at least one polyester block and an elastomeric polymer block, to a method for preparing such a block copolymer and to compositions containing such a modified unsaturated polyester. As also indicated supra, the modified polyester of this invention may be prepared by reacting a preformed elastomeric polymer, which elastomeric polymer contains at least one terminal carboxyl or hydroxyl group with a preformed unsaturated polyester resin or by polymerizing the unsaturated polyester onto the carboxyl or hydroxyl substituted block copolymer by condensing a suitable mixture of polyhydric alcohol and polycarboxylic acids thereon. The modified polyester of this invention can be used in thermosetting polyester resin compositions to produce essentially any product known in the prior art to be produceable from a thermosetting unsaturated polyester resin composition. The composition, is, however, particularly useful in bulk molding and sheet molding compounds.

In general, the elastomeric block of the block copolymer of this invention may be any of those elastomeric polymers known in the prior art which may be terminally functionalized so as to incorporate at least one terminal functional group which will be reactive with either a carboxyl or hydroxyl group. The elastomeric polymer may, of course, contain two such groups in which case, the modified polyester block copolymer ultimately prepared will contain two polyester blocks, one on each end of the elastomeric block. In a like manner, if the polyester is functionalized on both ends of the polymer and a monofunctional elastomer is employed, then a three block polymer may be prepared having elastomer end segments and a polyester mid segment. If both the elastomer and the polyester are functionalized on both ends of linear polymers, then segmented structures would be expected. It is, of course, important in the present invention that the elastomeric block be functionalized in such a manner as to incorporate only terminal functional groups since the incorporation of functional groups at any other point along the backbone of the elastomeric polymer would not produce the block copolymer ultimately sought in the present invention. In this regard, it should be noted that random distribution of functional groups along the elastomer backbone would reduce control over the relative number of polyester blocks per elastomeric segments in the ultimate polymer.

In general, the elastomer useful as a block in the block copolymers of this invention may itself be a homopolymer or copolymer. When the elastomer is a copolymer, the copolymer may be random, tapered or block. To insure preparation of an elastomer which can be functionalized only terminally, the elastomeric polymer useful in this invention, will, generally, be prepared by contacting the monomer or monomers with an organo alkali metal compound in a suitable solvent at temperatures within the range from about −150° C. to about 300° C. Particularly effective polymerization initiators are organo lithium compounds having the general formula $RLi_n$ wherein R is an aliphatic, cycloaliphatic or aromatic hydrocarbon radical having from 1 to about 20 carbon atoms and n is an integer equal to 1 or 2. In general, the elastomeric polymers useful as a block in the block copolymer of the present invention will have a weight average molecular weight within the range from about 2,000 to about 200,000 and when the elastomeric polymer is a copolymer of 1 or more diolefins and 1 or more other monomers, the elastomeric polymer will comprise from about 30 to about 99 wt % monomeric diolefin units. At this point, it should again be noted, that it is essential to the present invention that the elastomeric polymer initially be a living polymer; i.e., a polymer containing at least one terminal active group, such as an alkali metal atom bonded to a terminal carbon atom, which can be treated so as to incorporate a functional group which may then be reacted with either a carboxyl or hydroxyl group.

Elastomeric homopolymers and copolymers useful in the present invention are within the scope of those terminally reactive homopolymers and copolymers described in U.S. Pat. Nos. 3,135,716; 3,150,209; 3,496,154; 3,498,960; 4,145,298 and 4,238,202, the disclosure of which patents are herein incorporated by reference, particularly those homopolymers and copolymers prepared with mono- and dilithium substituted organo metallic compounds. In general, the elastomers taught by these patents may be polymers of one or more conjugated dienes containing from about 4 to about 12 carbon atoms such as 1,3-butadiene, isoprene, piperylene, methylpentyl diene, phenylbutadiene, 3,4-dimethyl-1,3hexyldiene, 4,5-diethyl-1,3-octadiene and the like, preferably those containing 4 to 8 carbon atoms. Moreover, one or more of the hydrogen atoms in these conjugated diolefins may be substituted with halogen. The elastomeric polymers may also be copolymers of one or more of the aformentioned conjugated diolefins and one or more other monomers. Other monomers which may be used in the elastomeric polymers useful in this invention include aryl-substituted olefins such as styrene, various alkyl styrenes, paramethoxystyrene, vinyl naphthalene, vinyl toluene and the like.

In addition to the foregoing polymers, other block copolymers useful as the elastomeric block in the block copolymer of the present invention may be prepared in accordance with methods described in U.S. Pat. Nos. 3,231,635; 2,265,765 and 3,322,856. In general, block copolymers prepared in accordance with the methods described in the foregoing patents may be represented by one of the following general formulae: $B_x-(A-B)_y$ and $A_x-13(B-A)_y$ wherein x is a number equal to 0 or 1 and y is a whole number from 1 to about 15. A and B are as defined in the aforementioned U.S. Pat. Nos. 3,231,635; 3,265,765 and 3,322,856. As will be apparent from the foregoing, the elastomeric polymer useful as a block in the block copolymer of the present invention may, itself, be a block copolymer containing two or more polymeric blocks. As indicated more fully hereinafter, the preferred elastomer useful in the block copolymer of this invention will, itself, be a diblock having the general formula A-B wherein A and B are as defined in the aforementioned patents.

In general, any of the unsaturated polyesters known in the prior art and prepared by condensation of an unsaturated dicarboxylic acid and/or an anhydride thereof and a polyhydric alcohol may be used to form the polyester block of the block copolymer of this invention. Suitable unsaturated polyesters also include those obtained by replacing up to about 90 mol % of the unsaturated dicarboxylic acid or anhydride thereof with a saturated dicarboxylic acid or an anhydride thereof. Suitable dicarboxylic acids or anhydrides which may be condensed to prepare the unsaturated polyester block useful in the block copolymer of this invention include maleic, fumeric, itaconic, citraconic, chloromaleic, mesaconic, glutaconic and the like. Suitable saturated dicarboxylic acids or anhydrides which may be substituted for a part of the unsaturated dicarboxylic acid or anhydride include, but are not necessarily limited to, phthalic, succinic, adipic, azelic, isophthalic, chloroendric, tetrafluorphthalic and the like. Suitable polyhydric alcohols, particularly dihydric alcohols, include, but are not necessarily limited to, linear glycols such as ethylene glycol, propylene glycol, dipropylene glycol, diethylene glycol, 1,3-butanediol, neopentylglycol, 1,4-cylcohexane dimethanol, mixtures of these glycols and cyclohexane dimethanol with hydroxy-alkyl ethers of bis-phenol A and the like. Suitable unsaturated polyesters include those described in U.S. Pat. Nos. 3,925,299; 3,925,300 and 3,489,707, the disclosure of which patents are herein incorporated by reference. In general, these polyesters are produced by condensing the dicarboxylic acid or anhydride or mixtures thereof which a dihydric alcohol or mixtures thereof at a temperature within the range from about 30° C. to about 205° C. The condensation reaction is usually terminated when an acid number less than about 100 is reached as determined most frequently by use of an indicator such as toluhydroquinone, hydroquinone, a methyl ester of hydroquinone, m-dinitrobenzene and the like.

In preparing the modified polyester of this invention, which modified polyester is a block copolymer comprising at least one polyester block and an elastomer block, which elastomer block may, itself, be a block copolymer, a living elastomeric polymer may first be functionalized so as to incorporate at least one terminal carboxyl or hydroxyl group and thereafter reacted with a preformed polyester or combined with a mixture of suitable dicarboxylic acids and polyfunctional alcohols under conditions at which either the dicarboxylic acid or polyhydric alcohol will react with the terminal functional group and at which the remaining dicarboxylic acid monomers and polyhydric alcohols condense to form an unsaturated polyester which is chemically bonded to the elastomer through an ester linkage.

In general, the living polymer which is useful as the elastomeric block in the block copolymer of this invention can be converted to a carboxyl or hydroxyl terminated polymer using techniques well known in the prior art. For example, the living elastomeric polymer may be reacted with $CO_2$ and then with an acid to form terminal carboxyl groups. When this is done, however, it would be advantageous to incorporate terminal steric hindering groups, as is taught in copending U.S. patent application Ser. No. 946,269 to avoid coupling of the elastomers during the reaction with $CO_2$, the disclosure of which copending U.S. application is herein incorporated by reference. Similarly, the living polymer may be reacted with an alkalene oxide and then with a proton source such as water, an acid or the like to incorporate a terminal hydroxyl group. In general, reaction of the alkali metal polymer alkyl with the functionalizing agent will be accomplished at a temperature within the range from about 0° to about 80° C. at a pressure within the range from about atmospheric to about 500 psig. Also, further reaction with a suitable acid or other proton source will be accomplished at the same conditions.

After the desired functional group has been incorporated into an ethylenically unsaturated elastomeric polymer, the polymer will, then, be hydrogenated, using methods well known in the prior art so as to effectively saturate from about 90 to about 99% of the ethylenic unsaturation remaining in the diolefin portion of the polymer. In general, the hydrogenation methods known in the prior art involve the use of a suitable catalyst, particularly a catalyst or catalyst precursor comprising a Group VI or Group VIII metal atom. Suitable catalysts are described in U.K. Patent Specification No. 1,030,306, the disclosure of which patent specification is herein incorporated by reference. A particularly preferred method for hydrogenating the elastomeric polymer useful in the block copolymer of this invention is described in U.S. Pat. No. 3,700,633, the disclosure of which patent is herein incorporated by reference. In the process taught in U.S. Pat. No. 3,700,633, hydrogenation of the polymer is accomplished in the same solvent as was used during the polymerization with a catalyst comprising the reaction product of an aluminum alkyl and a nickel or cobalt carboxylate or alkoxide. In general, hydrogenation is accomplished at a temperature within the range from about 25° C. to about 175° C. at a hydrogen partial pressure below about 5,000 psig, and usually within the range from about 250 to about 1,500 psig. In general, contacting times within the range from about five minutes to about eight hours will be sufficient to permit the desired degree of hydrogenation. When the elastomeric polymer contains aromatic unsaturation, relatively mild hydrogenation conditions, e.g. temperatures below about 175° C. and hydrogen partial pressure less than about 800 psig, will be employed so as to at least minimize, if not eliminate, any hydrogenation of the aromatic unsaturation.

After the preformed elastomeric polymer has been suitably functionalized and hydrogenated, the same will next be combined with a preformed unsaturated polyester or with a mixture of monomer that can then be condensed to form an unsaturated polyester. As is well known, preformed polyesters containing a terminal carboxyl group on one end and a terminal hydroxyl group on the other end can be prepared by reacting equal molar quantities of a diol and a diacid. When a preformed elastomer containing at least one terminal carboxyl group is combined with a polyester having at least one terminal hydroxyl group, then, a hydroxyl group of the polyester will react with the carboxyl group on the elastomer to, in effect, form a block copolymer comprising a polyester block and an elastomer polymer block. Similarly, when the preformed elastomer contains at least one terminal hydroxyl group, this hydroxyl group will react with a terminal carboxyl group of the preformed polyester having at least one terminal carboxyl group. When the preformed elastomer is combined with a suitable mixture of unsaturated dicarboxylic acid and dihydric alcohol, which suitable mixture may also comprise saturated dicarboxylic acids, on the other hand, an acid group on an acid monomer will react with hydroxyl terminated elastomers while a hydroxyl group from a dihydroxy monomer will react with carboxyl terminated elastomers. In either case, the polyester can then be grown via condensation. In general, reaction of the terminally functionalized elastomer and either the preformed polyester or a polyester monomer will occur at a temperature within the range of from about 100° to about 300° C. and at a pressure within the range from about atmospheric to about 500 psig. In that embodiment wherein the preformed elastomer is combined with a suitable mixture of dicarboxylic acid monomer and dihydric alcohol monomer, condensation of the monomer will also occur at these conditions. In general, reaction between a preformed elastomer and a preformed polyester generally can be accomplished at a nominal holding time within the range from about 10 to about 200 minutes. In that embodiment where the polyester is formed via condensation, however, nominal holding times within the range from about 10 to about 500 minutes will be required. In both embodiments, the esterification reaction should be accomplished in an inert atmosphere. In general, the esterification reaction will be accomplished in a suitable solvent for both the elastomeric polymer and the polyester. Suitable solvents include, but are not necessarily limited to diisopropyl benzene, toluene, styrene, dichlorobenzene, and the like. Esterification may also be accomplished in a melt of the polyester. In general, the polyester block of the block copolymer of this invention will have a weight average molecular weight within the range from about 150 to about 20,000.

As indicated supra, the modified unsaturated polyester of this invention is particularly useful in thermosetting polyester resin compositions. The elastomeric segment contained in the modified unsaturated polyester of this invention will impart impact resistance to molded products. Since the elastomeric segment is chemically bonded to the modified unsaturated polyester, the improved impact resistance is achieved without destructive phase separation or rubber bleeding during storage of the resin composition or formation of the molded article. The modified unsaturated polyester of this invention may be used in combination with conventional polyesters in such thermosetting polyester resin compositions.

In general, the polyester resin compositions of this invention will comprise from about 1 to about 95 wt % of the modified polyester of this invention. The composition may also comprise from about 0 to about 94 wt % of an unmodified unsaturated polyester, which unmodified unsaturated polyester may be the same or different than the one incorporated into the block copolymer of this invention. The thermosetting unsaturated polyester resin composition of this invention will also comprise a vinyl monomer which acts both as a solvent and as a crosslinking agent. In general, the thermosetting resin composition of this invention will comprise from about 1 to about 50 wt % of such a vinyl monomer. The thermosetting resin composition of this invention will, generally, also comprise a curing agent. In general, the composition will comprise from about 0.001 to about 1 wt % of such a curing agent. The thermosetting resin composition may also comprise a filler, a reinforcing agent and a thickener. When a filler is used, the thermosetting resin composition will, generally, comprise from about 5 to about 90 wt % of said filler. When a reinforcing agent is used, the thermosetting resin composition will, generally, comprise from about 5 wt % to about 90 wt % of said reinforcing agent. When a thickener is used, the thermosetting resin composition will, generally, comprise from about 0.1 to about 5 wt % of said thickener.

In general, any of the vinyl monomers known to be useful in polyester resin compositions may be used in the thermosetting resin composition of the present invention. Suitable vinyl monomers include styrene and substituted derivatives thereof such as, for example, alphamethylstyrene, aminostyrene, methylethylaminostyrene, methoxy-styrene, chlorostyrene, dichlorostyrene, dimethylstyrene, trimethyl-styrene, t-butylstyrene, sodiumstyrene sulfonate, p-benzylstyrene, p-phenoxystyrene and similar aryl-substituted styrenes. Suitable vinyl monomers also include beta-hydrocarbyl substituted derivatives of acrylic acid in which the beta-hydrocarbyl substitution has 1 to about 8 carbon atoms such as, for example, ethylacrylic acid, propylacrylic acid, butylacrylic acid, amylacrylic acid, hexylacrylic acid, heptyl-acrylic acid, octylacrylic acid, phenylacrylic acid and vinylacrylic acid. Suitable vinyl monomers also include various acrylates and substituted acrylates such as, for example, methylacrylate, methyl methacrylate, ethylacrylate, butylmethacylate, butylacrylate and the like.

In general, any of the curing agents known in the prior art to be useful in thermosetting unsaturated polyester resin compositions may be used in the composition of the present invention. Generally, curing agents are conventional free radical polymerization initiators, particularly organic peroxides and hydroperoxides. Suitable curing agents, then, include benzoyl peroxide, dicumyl peroxide, methylethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate and the like. In addition, various azo compounds such as azylbisisobutyronitrile may be used. A particularly preferred curing agent is t-butylperbenzoate.

In general, any of the fillers known in the prior art to be useful in thermosetting polyester resins may be used in the thermosetting resin composition of the present invention. Suitable fillers include calcium carbonate, calcium silicate, silica, calcined clay, chalk, talc, limestone, anhydrous calcium sulfate, barium sulfate, asbestos, powdered glass, quartz, aluminum hydrate, aluminum oxide, antimony oxide and the like.

Similarly, any of the reinforcing agents known to be useful in thermosetting polyester resin compositions may be used in the thermosetting resin composition of this invention. Suitable reinforcing agents, then, include fibers of glass, metal silicates, asbestos, cellulose, carbon, graphite, polyesters, polyacryls, polyamides and polyolefins. Chopped glass fibers are particularly effective for use as reinforcing agents.

In general, any of the thickening agents known in the prior art to be useful in thermosetting polyester resin compositions may be used in the thermosetting resin compositions of this invention. Suitable thickners include oxides and/or hydroxides of metals of Group II of the Periodic Table and are selected from the oxides and hydroxides of magnesium, calcium, strontium, barium and zinc. The hydroxides of magnesium and/or calcium are particularly effective thickening agents.

In addition to the previously named components which may be included in a thermosetting resin composition within the scope of the present invention, the thermosetting unsaturated polyester resin composition of this invention may also comprise pigments, colorants, lubricants, stabilizers, silane coupling agents and the like. In this regard, it should be noted that conventional colorants and pigments such as $TiO_2$, carbon black, phthalocyanide pigment and the like and mixtures thereof are frequently employed in amounts sufficient to give the desired color to the final molded product. It should also be noted that lubricants such as aluminum, berium, calcium, magnesium and/or zinc stearate and the like may be used to impart mold release properties to the composition.

The ingredients of the thermosetting resin composition of this invention may be combined by a mixing technique which involves moderate to high shear agitation. This can be accomplished by means of twin rotor mixers designed to give moderate shear to the paste-like ingredients. It is essential to provide some shear and because of the viscosity of the materials being mixed, proper mixing cannot be obtained simply by stirring or by using a conventional impeller mixer. On the other hand, high intensity mixing which would generate excessive heat (thereby raising the temperature more than about 100° C.) and activate the catalyst must be avoided. This mixing under sufficient shear to achieve good dispersion of the ingredients without heat buildup sufficient to activate the catalyst insures a good blend and is necessitated by the fact that the resin composition may contain normally solid material. Shear which gives a heat buildup, preferably, between about 2° to about 40° C. is particularly satisfactory. Low shear is preferred for bulk molding compositions (BMC) to avoid glass degradation. The modified unsaturated polyester of this invention may be blended with any unmodified unsaturated polyester used in the blend before incorporating the same into the molding composition or each of these components may be added separately during the mixing. Preferably, however, the polyesters will be blended before incorporation into the molding composition.

The thermosetting polyester resin composition of this invention may be cured at conditions known to be effective for this purpose in the prior art. Generally, temperatures within the range from about 100° C. to about 200° C. and a nominal holding time from about 1 to about 15 minutes is generally sufficient.

PREFERRED EMBODIMENT OF THE INVENTION

In a preferred embodiment of the present invention, the modified polyester will be a block copolymer comprising a single polyester block and a single elastomeric block, which elastomeric block will, itself, be a diblock comprising a polymeric block containing predominantly monoalkenyl aromatic hydrocarbon monomer units and a polymeric block containing predominantly conjugated diolefin units. The preferred modified polyester of this invention will then be a triblock having the general formula A—B—C wherein A is a polymeric block containing predominantly monoalkenyl aromatic hydrocarbon units, B is a polymeric block containing predominantly conjugated diolefin monomeric units and C is an unsaturated polyester block. In the preferred embodiment, the A block will have a weight average molecular weight within the range from about 1,000 to about 50,000, the B block will have a weight average molecular weight within the range from about 1,000 to about 150,000 and the C block will have a weight average molecular weight within the range from about 150 to about 15,000. In a most preferred embodiment, the monoalkenyl aromatic hydrocarbon monomer will be styrene, the conjugated diolefin will be butadiene and the polyester will be the condensation product of maleic acid and/or maleic anhydride and propylene glycol. In a preferred modified polyester embodiment, the polyester block may have up to about 90% of the unsaturated dicarboxylic acid replaced by or substituted with a saturated dicarboxylic acid. The preferred modified polyester will be prepared by reacting a selectively hydrogenated A—B diblock containing a terminal hydroxyl group on the conjugated diolefin polymeric block with a preformed polyester at a temperature within the range from about 100° to about 300° C. in a suitable solvent, most preferably a chloro substituted benzene, at a pressure within the range from about atmospheric to about 100 psig and in an inert atmosphere, preferably an atmosphere containing nitrogen. In a preferred thermosetting unsaturated polyester resin composition, a modified unsaturated polyester resin within the scope of the present invention will, in effect, be substituted for from 30 to about 100% of the conventional unsaturated polyester normally used in such compositions. A preferred thermosetting unsaturated polyester resin composition will, then, comprise from about 40 to about 80 wt % of a modified unsaturated polyester within the scope of the present invention and from about 0 to about 40 wt % of an unmodified or conventional unsaturated polyester. As used herein, the recitation "unmodified unsaturated polyester" is intended to mean any unsaturated polyester known in the prior art and which is not combined into a block copolymer with an elastomeric block. In a most preferred thermosetting unsaturated polyester resin composition, the modified unsaturated polyester will be a condensation reaction product of maleic acid and/or anhydride and propylene glycol. It will, of course, be appreciated that incorporation of the modified unsaturated polyester into the composition effectively incorporates from about 1 to about 50 wt % of an elastomeric polymer into said composition.

In addition to the modified and unmodified unsaturated polyesters, a preferred thermosetting unsaturated polyester will also comprise from about 5 to about 50 wt % of an ethylenically unsaturated monomer capable of functioning as both a solvent and as a crosslinking agent. In a most preferred composition, the vinyl monomer will be styrene. A preferred thermosetting composition will also comprise from about 0.1 to about 0.5 wt % of a curing agent.

Having thus broadly described the present invention and a preferred embodiment thereof, it is believed that the same will become even more apparent by reference to the following examples. It will be appreciated, however, that the examples are presented solely for purposes of illustration and should not be construed as limiting the invention.

EXAMPLE 1

In this Example, an A—B—C triblock copolymer was prepared by combining a preformed hydrogenated A—B diblock copolymer having a terminal —OH group with an equal molar mixture of maleic anhydride and propylene glycol and heating to a temperature at which esterification occurred and holding at these conditions until the esterification was substantially complete. In the preformed diblock, block A was a styrene polymer having a weight average molecular weight of 6,600 and block B was a hydrogenated butadiene polymer having a weight average molecular weight of 19,400. The butadiene block was hydrogenated such that about 98% of the original, residual unsaturation was hydrogenated. The terminal—OH group was incorporated by reacting the living diblock containing a terminal lithium atom with ethylene oxide to first form the lithiumpolymer alkoxide and then with an acid solvent to form the hydroxyl group. In preparing the triblock copolymer, 53.8 g of maleic anhydride and 46.3 g of propylene glycol were combined and heated with stirring. When the reaction mixture reached about 150° C., 10 g of the hydroxyl terminated block copolymer was added. In this run, the solvent, diisopropyl-benzene, was then added in four separate increments of 20 ml each as the mixture was heated to a temperature ranging from about 149° C. to 156° C. The heat-up (to about 149° C.) took about one hour and the mixture was then held at a temperature within the range of about 149° C. to about 156° C. for about four hours. The mixture was stirred continuously from start to finish. A flow of argon through the reactor swept water from the condensation reaction into a mineral oil bubbler. Accumulation of water in the bubbler was noted after about 20 minutes at 150° C. After the stirrer was stopped, the mixture separated into two layers, a clear upper layer and a yellow lower layer. The mixture was then poured into methanol and a white gummy polymer precipitated. The polymer was recovered, dissolved in cyclohexane and then reprecipitated in isopropyl alcohol. This product was then washed several times with methanol and subjected to infrared (IR) spectroscopy. The IR clearly indicated the presence of a polyester block with peaks at 1150–1200 cm$^{-1}$ and 1730–1740 cm$^{-1}$ and an elastomer block (a diblock really) with peaks at 1600 cm$^{-1}$ and 700 cm$^{-1}$. The yield of precipitated polymer was 16 g. Assuming that all of the precipitated polymer was an A—B—C triblock, the polyester block C would have a weight average molecular weight of about 15,000. It will, of course, be appreciated that any polyester formed during the esterification reaction but not reacted with a hydroxyl terminated block copolymer would dissolve in the methanol initially used to precipitate the product. Polyester which has reacted with the diblock would not, however, dissolve in methanol and would precipitate therein along with any unreacted diblock.

EXAMPLE 2

In this Example, the run of Example 1 was repeated except that 10.78 g maleic anhydride and 9.77 g of propylene glycol were first combined in a flask and heated slowly (2 hours) under argon to a temperature of 150° C. Condensate (water) was swept from the reactor by a flow of argon. The water was trapped in a mineral oil bubbler. 40.00 g of hydroxyl terminated diblock copolymer identical to that used in Example 1 and 320 ml diisopropylbenzene were then added and the combined mixture was then held at a temperature within the range of 150°–155° C. for 3¼ hrs. Upon cooling, the reactor product (a solution) separated into two phases. The upper layer containing the styrene-hydrogenated butadiene-polyester triblock was decanted. The triblock copolymer was then recovered by coagulation in methyl alcohol and purified as outlined in Example 1. IR again confirmed the presence of both a polyester block and an elastomeric block, which elastomeric block was itself a diblock copolymer. The amount of precipitated polymer recovered was only 39.6 g. Apparently, a portion of the triblock copolymer product was lost during the recovery thereof.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of this invention.

Having thus described and illustrated the invention, what is claimed is:

1. A block copolymer consisting of a single unsaturated polyester block and a single substantially saturated elastomeric block that comprises predominantly hydrogenated conjugated diolefin monomer units.

2. The block copolymer of claim 1 wherein said substantially saturated elastomeric block is itself a block copolymer segment comprising at least one block containing predominantly monoalkenyl aromatic hydrocarbon monomer units and at least one block containing predominantly hydrogenated conjugated diolefin monomer units.

3. The block copolymer of claim 2 wherein said block containing predominantly monoalkenyl aromatic hydrocarbon monomer units has a weight average molecular weight within the range from about 1,000 to about 50,000, said block containing predominantly hydrogenated conjugated diolefin monomer units has a weight average molecular weight within the range from about 1,000 to about 150,000 and said polyester block has a weight average molecular weight within the range from about 150 to about 20,000.

4. The block copolymer of claim 3 wherein said elastomeric polymer block is a diblock.

5. The block copolymer of claim 4 wherein said monoalkenyl aromatic hydrocarbon monomer is styrene and said conjugated diolefin is butadiene.

6. The block copolymer of claim 5 wherein said polyester block contains maleic acid or maleic anhydride monomer units and propylene glycol monomer units.

7. A thermosetting unsaturated polyester resin composition comprising a block copolymer that consists of a single unsaturated polyester block and a single substantially saturated elastomeric polymer block, the elastomeric polymer block containing predominantly hydrogenated conjugated diolefin monomer units.

8. The thermosetting polyester unsaturated resin composition of claim 7 wherein said elastomeric block is itself a block copolymer segment comprising at least one block containing predominantly monoalkenyl aromatic hydrocarbon monomer units and at least one block containing diolefin monomer units.

9. The thermosetting polyester resin composition of claim 8 wherein said block containing predominantly monoalkenyl aromatic hydrocarbon units has a weight average molecular weight within the range from about 1,000 to about 50,000, said block containing predominantly conjugated diolefin monomer units has a weight average molecular weight within the range from about 1,000 to about 150,000 and said polyester block has weight average molecular weight from about 150 to about 20,000.

10. The thermosetting polyester resin composition of claim 9 wherein said elastomeric polymer block is a diblock.

11. The thermosetting polyester resin composition of claim 10 wherein said monoalkenyl aromatic hydrocarbon monomer is styrene and said conjugated diolefin monomer is butadiene.

12. The thermosetting polyester resin composition of claim 11 wherein said polyester contains maleic acid or maleic anhydride monomer units and propylene glycol monomer units.

* * * * *